United States Patent
Behringer et al.

(10) Patent No.: US 10,512,999 B2
(45) Date of Patent: Dec. 24, 2019

(54) CUT GUARD FOR A WORK TOOL

(71) Applicant: Andreas Stihl AG & Co. KG, Waiblingen (DE)

(72) Inventors: Patrick Behringer, Ostfildern (DE); Juergen Haeberlein, Winnenden (DE); Sven Keller, Berglen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 103 days.

(21) Appl. No.: 14/542,490

(22) Filed: Nov. 14, 2014

(65) Prior Publication Data

US 2015/0128428 A1    May 14, 2015

(30) Foreign Application Priority Data

Nov. 14, 2013  (DE) .................. 10 2013 019 155

(51) Int. Cl.
*B23Q 13/00*     (2006.01)
*B27G 19/04*     (2006.01)

(52) U.S. Cl.
CPC ............ *B23Q 13/00* (2013.01); *B27G 19/04* (2013.01)

(58) Field of Classification Search
CPC ................................ B23Q 13/00; B23D 59/00
USPC ................... 30/286; 206/349; 220/4.24, 7
See application file for complete search history.

(56) References Cited

U.S. PATENT DOCUMENTS

| | | | | |
|---|---|---|---|---|
| 102,923 A * | 5/1870 | Disston | ............ | B23D 59/00 |
| | | | | 206/349 |
| 1,221,023 A * | 4/1917 | Cameron | ............ | F16B 43/00 |
| | | | | 301/68 |
| 4,139,093 A * | 2/1979 | Holmes | ............ | G07D 9/004 |
| | | | | 206/0.82 |
| 4,896,771 A | 1/1990 | Edwards | | |
| 5,106,252 A * | 4/1992 | Shapton | ............ | F16B 43/007 |
| | | | | 411/519 |
| 5,738,214 A | 4/1998 | Wyss | | |
| 6,267,239 B1 * | 7/2001 | Maki | ............ | B65D 85/58 |
| | | | | 206/303 |
| 6,301,747 B1 | 10/2001 | Parein | | |
| 7,111,876 B2 * | 9/2006 | Hayashi | ............ | F16L 23/032 |
| | | | | 285/415 |
| 8,177,062 B1 * | 5/2012 | Fruits | ............ | A45C 11/00 |
| | | | | 206/316.1 |
| 8,720,009 B2 | 5/2014 | Schneider | | |
| 2012/0273376 A1 * | 11/2012 | Nicholls | ............ | B25H 3/006 |
| | | | | 206/349 |

FOREIGN PATENT DOCUMENTS

CN            203156782 U      8/2013

* cited by examiner

*Primary Examiner* — Mollie Impink
*Assistant Examiner* — Raven Collins
(74) *Attorney, Agent, or Firm* — Walter Ottesen, P.A.

(57) ABSTRACT

The invention relates to a multi-part cut guard for a tool that is rotatable in a cutting plane. The cut guard includes a first part element and at least one further part element. The part elements are connected together at their ends and form a closed circumference. Opposing first ends of the part elements are connected together, forming a pivot joint. The second ends of the part elements are fixed releasably together. The pivot joint is formed from a latching receptacle and a latching stub which form the pivot joint in the latched state and are intended to be separated in order to release the latching.

27 Claims, 10 Drawing Sheets

CUT GUARD FOR A WORK TOOL

CROSS REFERENCE TO RELATED APPLICATION

This application claims priority of German patent application no. 10 2013 019 155.6, filed Nov. 14, 2013, the entire content of which is incorporated herein by reference.

BACKGROUND OF THE INVENTION

U.S. Pat. No. 102,923 A discloses a two-part transporting device for a circular saw blade. The two part elements of the transporting device are connected in a pivotable manner at one end by way of a hinge and are held together at the other end by way of a hook.

A user can only remove the tool from the transporting device by releasing the hook and pivoting the two part elements with respect to one another. The user can only close the tool case by orienting the two part elements such that the ends of the part elements rest against one another and by hooking in the hook. This can be awkward, in particular when working in the field. In the hooked state, the hook can release by itself, and thus in an undesired manner, with the result that the function of a transporting device for a tool is no longer provided. In addition, as a result of the use of a hinge, the two part elements are always connected together when used as intended. Provision is not made for the two part elements to be separated from one another.

SUMMARY OF THE INVENTION

It is an object of the invention to provide a cut guard that is easy and safe to handle, wherein, in particular, a rotary tool can be inserted easily and safely into the cut guard and can be removed easily and safely from the cut guard again.

The multi-part cut guard of the invention is for a work tool configured to rotate in a cutting plane. The multi-part cut guard includes: a first part element having a first and a second end; a second part element having a first and a second end; the first part element and the second part element being configured to interconnect at corresponding ones of the first and corresponding ones of the second ends so as to mutually define a closed circumference; a latch receptacle at one of the first ends; a latch stub at the other one of the first ends; the latch receptacle and the latch stub being configured to latch together so as to conjointly form a pivot joint when in a latched state; the pivot joint interconnecting the first end of the first part element and the first end of the second part element; the second end of the first part element and the second end of the second part element being configured to detachably interconnect; and, the latch stub and the latch receptacle being configured to be separated from each other when in an unlatched state.

According to the invention, the multi-part cut guard includes a first part element and at least one further part element. The part elements are connected together at their ends and form a closed circumference. As a result, a rotary tool can be accommodated in the cut guard in its cutting plane. Opposing first ends of the part elements are connected together, forming a pivot joint, and the second ends of the part elements are fixed releasably together. The pivot joint is formed from a latching receptacle (or latch receptacle) and a latching stub (or latch stub) which form the pivot joint in the latched state and are intended to be separated by releasing the latching. As a result, the pivot joint forms at the same time a connection to be opened such that the part elements can be released easily not just at one end but at both ends. Opening of the cut guard as required at a suitable location is achieved.

The latching stub is expediently arranged on the first part element and the latching receptacle is formed on the second part element.

If one pivot joint is provided at each of the two ends of the part elements, the cut guard can be opened at either pivot joint. One part element of the cut guard can be pivoted in each case about the other, unopened pivot joint. In this case, it is immaterial which of the two pivot joints is opened in order to release the latching. Therefore, the cut guard is easy and user-friendly to handle. If one of the pivot joints is in the latched state and the other pivot joint in the released state, then the one part element can be rotated about the other part element—specifically about the latched pivot joint—in the direction of opening. A rotary tool can thus be inserted into and removed from the cut guard easily and safely.

The latching stub advantageously has an inclined surface, and the first part element is expediently pivotable about the second part element to a maximum angle. If the first part element is pivoted about the second part element beyond the maximum angle, the latching receptacle slides over the inclined surface of the latching stub and releases the latching. This ensures that if the first part element is pivoted about the second part element beyond the maximum angle, the pivot joint is not damaged. Furthermore, as a result, the pivot joint can be released from the latched state by the first part element being pivoted about the second part element beyond the maximum angle. As a result, the two part elements can be released from one another easily without the user depressing the latching stub.

Preferably, a stop for the second part element is formed on the first part element, wherein the stop limits the pivoting of the first part element about the second part element to a maximum angle. The stop is advantageously arranged in the region of the pivot joint.

Advantageously, the part elements are identical parts. As a result, the part elements, produced for example as plastics injection-molded parts, can be produced in the same injection mold. The subsequent handling of a cut guard made of identical parts is also simplified, since the user does not have to distinguish between the two part elements which are intended to form the cut guard, because they are identical parts. As a result, the identical parts can always be released and put back together again easily.

Expediently, the first part element and the second part element are configured in a flexurally rigid manner. As a result, the cut guard always remains stable when accommodating different tool geometries, in particular in the case of two-blade cutters, for example a grass cutter. Two-blade cutters expediently rest against only two locations in the cut guard, in particular against one location on the first part element and against a further location on the second part element. As a result of the flexurally rigid configuration of the part elements, the cut guard is torsionally rigid and the tool cannot release from the cut guard in an undesired manner. Thus, the rotary tool is always safely stored in the cut guard.

Advantageously, the part element is configured as an accommodating profile. The accommodating profile expediently has two opposing side walls. As a result, the tool can be accommodated in the accommodating profile. In particular, the opposing side walls at least partially enclose the tool. Expediently, the blade of the tool is enclosed by the accommodating profile of the part element. This ensures that the rotatable tool and in particular the blades of the rotary tool cannot be damaged.

Preferably, the side walls are arranged in a parallel manner and at a side wall spacing, wherein the side walls are preferably connected via an end-side connection. As a result of the parallel arrangement of the side walls with a side wall spacing, in particular a rotary tool having a particular thickness can be accommodated, wherein the thickness is advantageously less than or equal to the side wall spacing. As a result of the connection of the side walls by way of an end-side connection, the side walls are connected stably together. In addition, the end-side connection protects the rotary tool, in particular the blade of the rotary tool, for example from damage.

In one embodiment of the invention, at least one first material cutout is provided on the first side wall. A material cutout saves material and thus weight. On account of the arrangement of the material cutout on the side wall, the stability of the part element and thus of the cut guard is largely retained.

Preferably, at least one second material cutout is provided on the second side wall. Advantageously, the first material cutout is arranged in an offset manner with respect to the second material cutout. Preferably, material is present on the second side wall opposite the first material cutout. This offset arrangement of the first material cutout with respect to the second material cutout prevents a user from being able to reach through the cut guard via the material cutouts. This is also prevented by material being present opposite the first material cutout. In addition, this makes it possible for the material cutouts to be formed in an extensive manner, thereby saving weight.

Preferably, the areas opened up on one side wall by all the material cutouts correspond in total to at least 10% of the surface of this side wall. As a result, the material cutouts contribute to a considerable saving of material.

Expediently, a bearing surface is formed on one side wall, wherein the tool expediently rests at least partially against the bearing surface. Since the bearing surface is formed on only one side wall, the two side walls can be configured in a relatively short manner, for example engaging around only the blade of the tool, and at the same time the tool can be held safely and stably in the cut guard by the bearing surface.

Advantageously, the accommodating profile is formed in an arcuate manner, in particular in a partially circular manner. As a result, a rotary tool can be accommodated easily in the cut guard. Furthermore, the cut guard is suitable not only for one type, but for different types of rotary tools, for example for two-blade, three-blade, four-blade cutting knives, circular tools or the like.

Preferably, the arc of the accommodating profile spans 180°. As a result, the cut guard includes two part elements, and each part element spans half of the cut guard. The tool can thus be inserted very easily into the cut guard, with the result that the cut guard is very easy to handle.

Advantageously, at least one funnel-shaped lead-in slope is formed in the part element. If the tool is inserted into the cut guard, the cut guard is closed by one part element being pivoted about the other part element. With the aid of the lead-in slope, the part element can be pivoted in around the tool.

Expediently, a bowl is formed on the part element in the region of the pivot joint, the bowl projecting out of the cutting plane of the rotary tool. In this way, the cut guard can accommodate a rotary tool in the case of which the knife blades project out of the cutting plane. As a result of the arrangement of the bowl in the region of the ends of the part element, the tool can be inserted laterally into the bowl. Advantageously, only one bowl is formed on one part element, wherein the bowls are open to one side—that is, laterally—in the circumferential direction. It may be advantageous for the bowl to include two half-bowls wherein in each case one half-bowl is arranged on one part element.

Advantageously, the two half-bowls of the part elements engage in one another at their joining edges by way of a form-fitting connection, in particular a tongue-and-groove connection, as a result of which the closed cut guard has increased stability.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
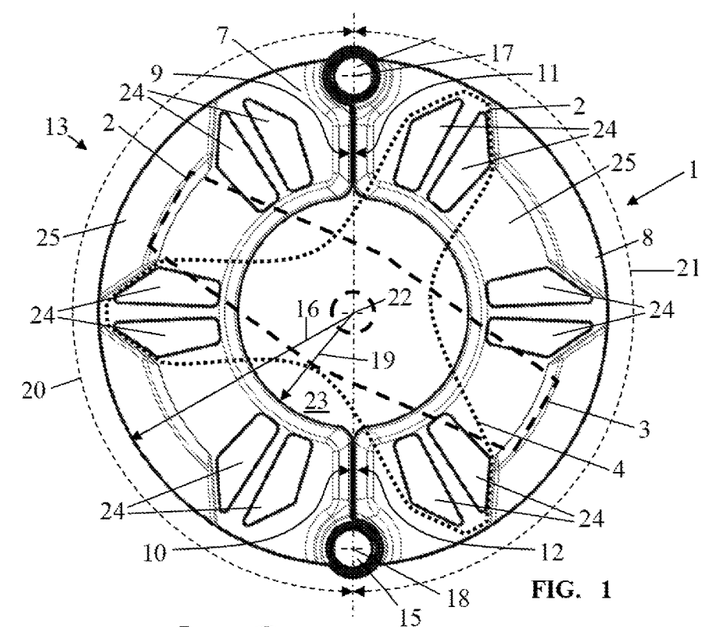
FIG. 1 is a plan view of a multi-part cut guard in the latched state.

FIG. 1 shows, as an exemplary embodiment, a cut guard 1 for a rotary tool 2, the rotation plane of which is located in a cut guard plane. The cut guard 1 is shown in a protective state 13. In the protective state 13, the tool 2 is stored safely in the cut guard 1.

Figure 10:
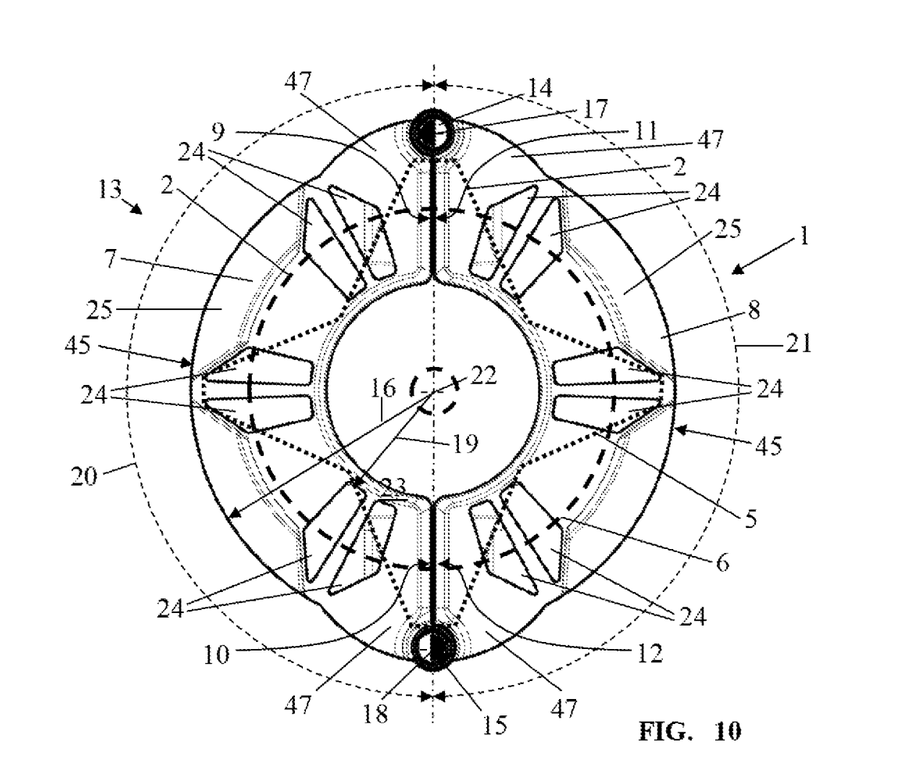
FIGS. 10 and 11 show a plan view and a bottom view of the cut guard in a further embodiment in the latched state.

The tool 2 is used for example in a brushcutter, a cut-off grinder, a circular saw or the like. The tool 2 can be embodied as a two-blade cutter 3, shown by way of dashed lines in FIG. 1, for example as a grass cutter, brush knife or the like, and as a three-blade cutter 4 (shown by way of dotted lines in FIG. 1), for example as a brush knife. The tool 2 can also, as shown in FIG. 10, be embodied as a four-blade cutter 5, for example as a grass cutter, or as a pointed-tooth or chisel-tooth circular saw blade 6, made of steel or of hard metal or the like. The cut guard 1 can accordingly accommodate tools 2 having different geometries, in particular having different shapes, having different diameters and having different thicknesses.

The cut guard 1 shown in FIG. 1 includes a first part element 7 and a second part element 8. The first part element 7 has a first end 9 and a second end 10, and the second part element 8, too, has a first end 11 and a second end 12. In the protective state 13, the first end 9 of the first part element 7 rests against the first end 11 of the second part element 8. Likewise, in the protective state 13, the second end 10 of the first part element 7 rests against the second end 12 of the second part element 8. The two part elements (7, 8) are connected together so as to form a first pivot joint 14 and a second pivot joint 15. The first pivot joint 14 is formed at the first ends (9, 11) of the part elements (7, 8). The second pivot joint 15 is formed at the second ends (10, 12) of the part elements (7, 8). Both pivot joints (14, 15) and thus all the ends (9, 10, 11, 12) of the part elements (7, 8) are connected together in a releasable manner.

In the protective state 13, the cut guard 1 is approximately circular in plan view about a midpoint 22. The circular form is defined by an outside radius 16. The part elements (7, 8) thus form a closed circumference in the protective state 13. The circular form makes it possible for tools 2 which rotate in a rotation plane during operation and the outside diameter of which is smaller than twice the outside radius 16 of the cut guard 1 to be accommodated in the cut guard 1.

The pivot joints (14, 15) project partially beyond the outside radius 16; accordingly, in the region of the pivot joints (14, 15), the cut guard 1 deviates from the circular form. The approximately circular pivot joints (14, 15) each have a circle center (17, 18). The circle centers (17, 18) are located within the cut guard 1 in plan view; accordingly, the distance of the first circle center 17 from the second circle center 18 is less than twice the outside radius 16. As a result of this arrangement of the pivot joints (14, 15), the pivot joints (14, 15) are protected by the arrangement of the midpoints (17, 18) within the cut guard 1, and in addition, as a result of the partial protrusion of the pivot joints (14, 15) beyond the outside radius 16, the second part element 8 is allowed to pivot about the first part element 7.

In the exemplary embodiment, the two part elements (7, 8) are embodied as identical parts. Since the two part elements (7, 8) are identical parts and the cut guard 1 is circular in plan view, the two part elements (7, 8) are semicircular and each span an arc (20, 21) of 180°.

In the center of the cut guard 1, namely around the midpoint 22 of the cut guard 1, the cut guard 1 has a circular clearance 23 with an inside radius 19. If the cut guard 1 is in the protective state 13 and no tool 2 has been inserted into the cut guard 1, it is possible to reach through the circular clearance 23. The circular clearance 23 saves material on the two part elements (7, 8) and thus on the cut guard 1, with the result that the cut guard 1 is lighter. In addition, it is possible to discern through the circular clearance 23 which tool 2 has been inserted into the cut guard 1. On account of the circular clearance 23, with an inserted tool 2, the cut guard 1 can be held and carried by way of the tool 2. The circular clearance 23 also makes it easier to insert and remove the tool 2 from the cut guard 1. If the inside radius 19 has been selected to be large enough, the cut guard 1 can accommodate the tool 2 fastened to the work apparatus, for example to the brushcutter. As a result, the cut guard 1 is usable not only to protect the tool 2 in the dismounted state removed from the work apparatus, but also as a cut guard 1 for the tool 2 mounted on the work apparatus.

The part elements (7, 8) are flexurally rigid, specifically such that the cut guard 1 is flexurally rigid in the protective state 13, too. This means that, in the case of tools 2 which contribute only very little to the stability of the cut guard 1, for example the two-blade cutter 3, the cut guard 1 nevertheless remains stable and torsionally rigid. As a result, the tool 2 is stored safely in the cut guard 1.

The part elements (7, 8) each have a first side wall 25, which is visible in plan view in FIG. 1. Six material cutouts 24 per part element (7, 8) are arranged in the first side wall 25 in the exemplary embodiment. The material cutouts 24 serve to save material and thus to lower the weight of the cut guard 1. The stability of the cut guard 1 is impaired to a negligible extent by the provision of the material cutouts 24 in the first side wall 25. The sum of the areas opened up by the material cutouts 24 is at least 10% of the surface of the first side wall 25.

Figure 2:
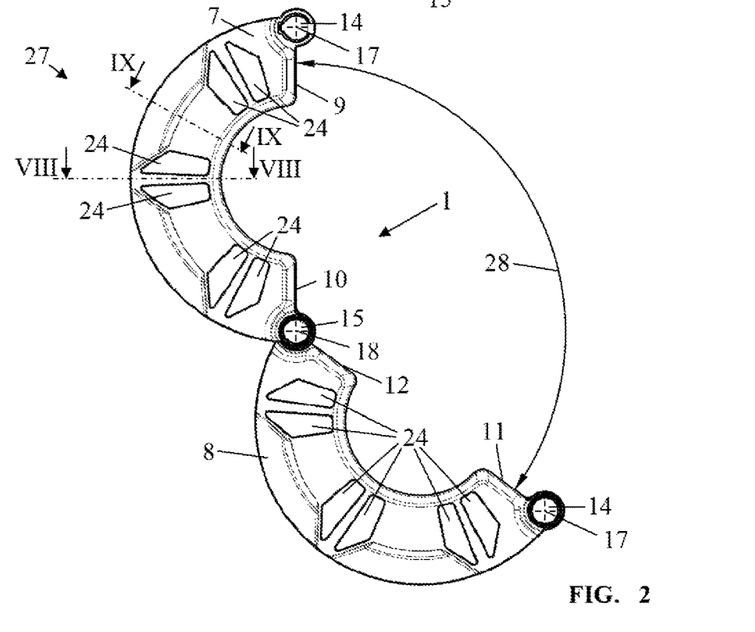
FIG. 2 is a plan view of the cut guard in the pivotable state.

FIG. 2 shows the cut guard 1 in a pivotable state 27. In the pivotable state 27, one of the pivot joints (14, 15), specifically the first pivot joint 14 in FIG. 2, has been released from the latching. The other pivot joint (15, 14), the second pivot joint 15 in FIG. 2, remains in the latched state and thus forms the pivot joint. In the pivotable state 27, the second part element 8 is thus pivotable about the first part element 7 about the second pivot joint 15. In the pivotable state 27, the first ends (9, 11) and the second ends (10, 12) have been separated from one another. If the ends (9, 10, 11, 12) move toward one another during the pivoting movement of the second part element 8 about the first part element 7, the cut guard 1 closes, with the result that the pivotable state 27 transitions into the protective state 13 shown in FIG. 1 by way of the latching of the first pivot joint 14.

In the pivotable state 27, a tool 2 can be inserted into the cut guard 1, and as a result of the second part element 8 being pivoted about the first part element 7, the cut guard 1 is closed and the tool 2 protected. If a tool 2 is in the cut guard 1 and the cut guard 1 is in the protective state 13, as a result of one of the pivot joints (14, 15) being opened, the second part element 8 can be pivoted about the first part element 7 and the tool 2 can be removed from the cut guard 1. When the cut guard 1 is opened, the ends (9, 10, 11, 12) move away from one another during the pivoting movement of the second part element 8 relative to the first part element 7.

The two part elements (7, 8) are pivotable with respect to one another up to a maximum angle 28. In the exemplary embodiment, the maximum angle 28 corresponds to the angle between the first end 9 of the first part element 7 and the first end 11 of the second part element 8, measured about the second midpoint 18 of the second pivot joint 15. In the exemplary embodiment, the maximum angle 28 is about 130°.

Figure 3:
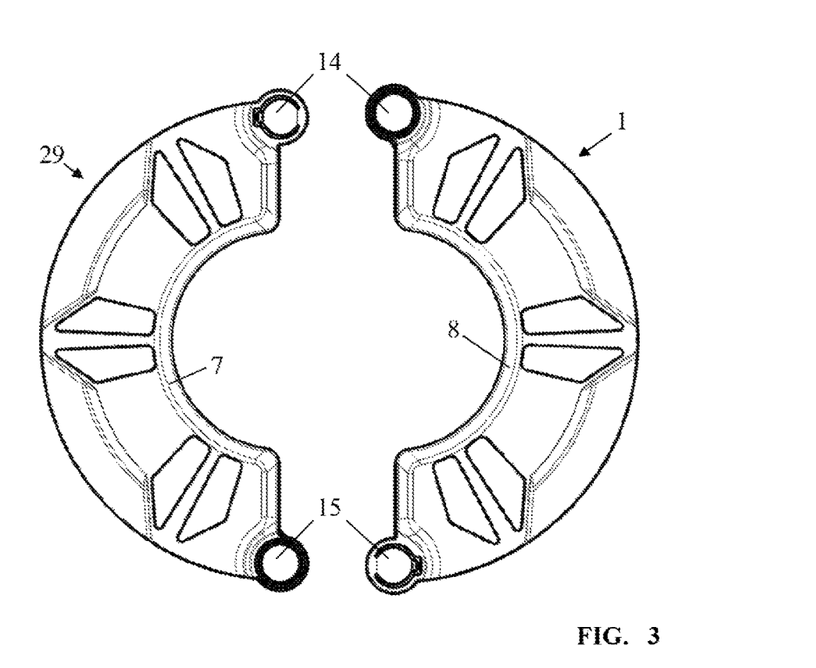
FIG. 3 is a plan view of the cut guard in the detached state.

FIG. 3 shows the cut guard 1 in a separated state 29. In the separated state 29, the two pivot joints (14, 15) have been released from the latching, as a result of which the two part elements (7, 8) have been completely separated from one another. In the separated state 29, the two part elements (7, 8) can be stored in a space-saving manner.

Figure 4:
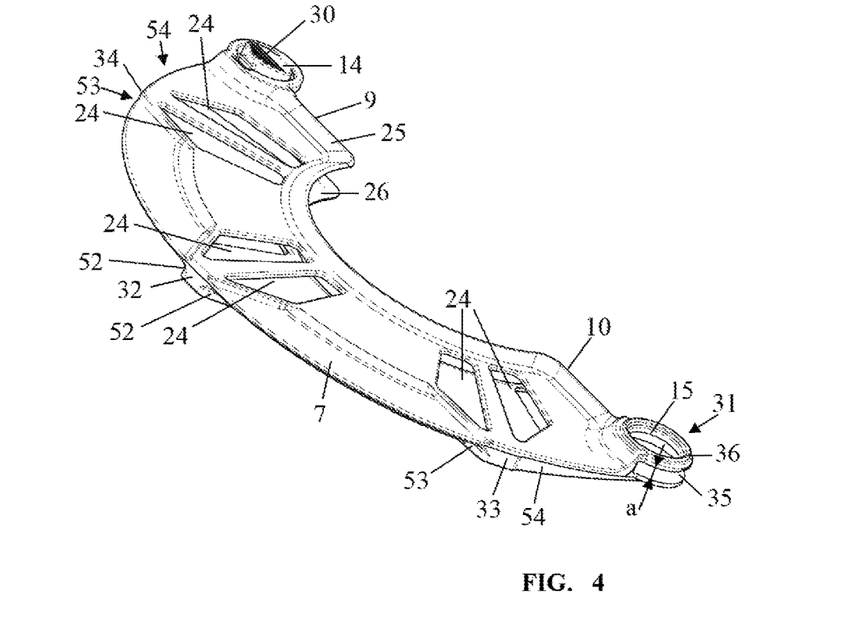
FIG. 4 shows a perspective view of a part element of the cut guard.

FIG. 4 shows the first part element 7 in a perspective view. The material cutouts 24 which are arranged on the first side wall 25 and pass through the first side wall 25 can be seen in FIG. 4. A second side wall 26 is located opposite the first side wall 25. Pockets (32, 33, 34) are formed on the second side wall 26. The pockets (32, 33, 34) are arranged opposite the material cutouts 24. Depending on the type of tool 2, for example the three-blade cutter 4 or the four-blade cutter 5, at least one blade tip of the tool 2 is inserted into at least one of the pockets (32, 33, 34). In this case, the pocket 32 arranged centrally on the part element 7 is formed with two tapered side walls 52. If the tool 2 is located with the blade tip in the central pocket 32, then the central pocket 32 fixes the tool 2. The lateral pockets (33, 34) have only one tapered side wall 53 each. The other side of the lateral pockets (33, 34), that is, the side which faces the pivot joints (14, 15), has been removed in the exemplary embodiment and forms an in particular funnel-shaped lead-in slope 54. As a result, the tool 2 can be inserted into one of the two part elements (7, 8), wherein the other part element (8, 7) pivots about the pivot joint 15 and as a result is transferable from the pivotable state 27 into the protective state 13 without colliding with the blade tip of the tool 2.

The pivot joints (14, 15) include a latching stub 30 and a latching receptacle 31, wherein one latching stub 30 and one latching receptacle 31 are arranged on each part element (7, 8). For example, in FIG. 4, the latching stub 30 is provided at the first pivot joint 14 and the latching receptacle 31 is provided at the second pivot joint 15 on the first part element 7. The latching receptacle 31 includes a bearing wall 35 and a ring 36. A receiving gap (a) is provided between the bearing wall 35 and the ring 36. The ring 36 and the bearing wall 35 are oriented parallel to one another. Both the ring 36 and the bearing wall 35 are arranged at the second end 10 of the first part element 7. In this case, the ring 36 is fastened to the first side wall 25 and the bearing wall 35 is fastened to the second side wall 26. In plan view, the outer boundary of the ring 36 coincides with the outer boundary of the bearing wall 35. The opening of the ring is configured such that the latching stub 30 can be pushed into the opening of the ring 36. The latching receptacle 31, which includes the bearing wall 35 and the ring 36, latches in this case with the latching stub 30.

Figure 5:
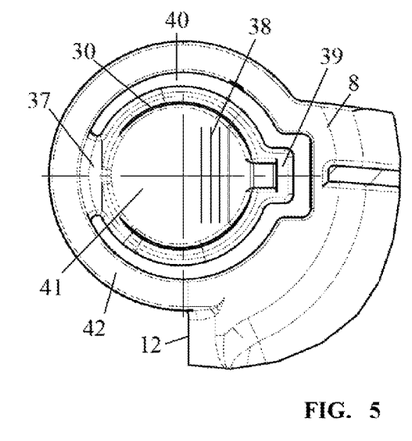
FIGS. 5 to 7 show detail views in section of a pivot joint having a latching receptacle and a latching stub.
Figure 6:
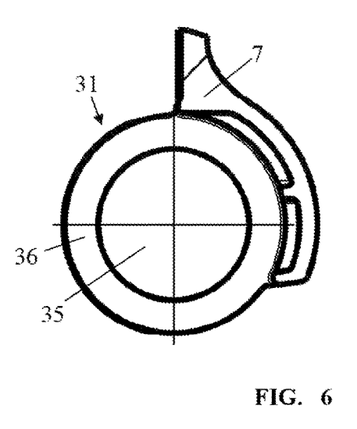
Figure 7:
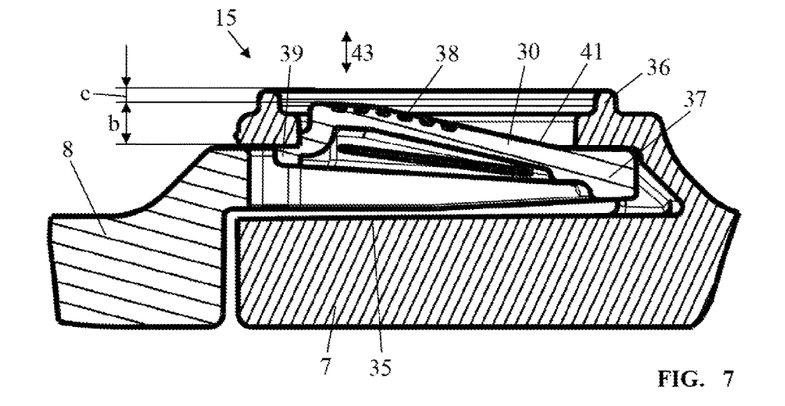

FIGS. 5 to 7 show the latching stub 30, the latching receptacle 31 and the interaction of the latching stub 30 with the latching receptacle 31 in the latched state as a pivot joint 15. The latching stub 30 integrally formed on the second part element 8 is shown by way of example in FIG. 5, wherein, on account of the identical parts of the two part elements (7, 8), the latching stub 30 is integrally formed in a corresponding manner on the first part element 7. Integrally formed on the part element 8 is a holder 42. The holder 42 is approximately in the form of three quarters of a circle. The holder 42 is similar to a ring. The latching stub 30 is held on the holder 42 via a resilient connection 37. The resilient connection 37 extends between the holder 42 and the latching stub 30 over approximately 20% of the annular gap 40 between the latching stub 30 and the holder 42. This ensures that, although the latching stub 30 is secured to the holder 42 and thus to the part element 8 via the resilient connection 37, the latching stub 30 can still at the same time be moved in a resilient manner relative to the part element 8. The direction of movement 43 of the latching stub 30 is shown in FIG. 7 and in the event of compression is directed toward the bearing wall 35 of the other part element 7, and in the event of rebound the latching stub 30 moves away from the bearing wall 35 in the direction of movement 43. The latched connection between the latching stub 30 and the latching receptacle 31 corresponds to a snap-fitting connection in the exemplary embodiment.

As shown in FIGS. 5 and 7, a lug 39 is formed on the latching stub 30 opposite the resilient connection 37. If the latching stub 30 forms a pivot joint 15 with the latching receptacle 31 (as for example in FIG. 7), the latching stub 30 is latched together with the latching receptacle 31, and the lug 39 bears against the periphery of the ring 36. In this way, the resilient connection 37 is slightly under tension in the latched state, with the result that the two part elements (7, 8) are latched stably together.

In order that a user has a positive grip when pressing the latching stub 30 toward the bearing wall 35, a number of grooves 38 are provided on the top side of the latching stub 30. The grooves 38 correspond to elevations and depressions in the surface of the latching stub 30. In the exemplary embodiment, the grooves 38 are parallel to the second end 12 of the second part element 8 and also parallel to the resilient connection 37. The same applies to the first part element 7.

In the region between the resilient connection 37 and the grooves 38, an inclined surface 41 is arranged on the latching stub 30. If the second part element 8 is pivoted about the first part element 7 beyond the maximum angle 28 shown in FIG. 2, then the latching stub 30 slides over the inclined surface 41 under the ring 36, with the result that the ring 36 pushes the latching stub 30, via the inclined surface 41, in the direction of movement 43 toward the bearing wall 35 counter to the force of the resilient connection 37. As a result, the latching stub 30 slides out of the latching receptacle 31, with the result that the latched connection is released. This construction prevents the pivot joint (14, 15) from being damaged if the second part element 8 is overtwisted about the first part element 7.

Between the bottom side of the ring 36, that is, the side facing the bearing wall 35, and the highest point of the latching stub 30, that is, the point furthest away from the bearing wall 35, a protrusion (b) is provided in the latched state. If the latched connection is intended to be released, the latching stub 30 has to be pushed down at least by the amount of the protrusion (b) in the direction of movement 43 toward the bearing wall 35, and subsequently the second part element 8 has to be twisted out of the first part element 7.

In the latched state, a safety gap (c) is provided between the top side of the ring 36 and the highest point of the latching stub 30. Accidental depression of the latching stub 30 and thus accidental opening of the latched connection can be prevented by the safety gap (c). In addition, the latching stub 30 is located in a protected manner within the latching receptacle 31, with the result that damage to the latching stub 30 is prevented.

Figure 8:
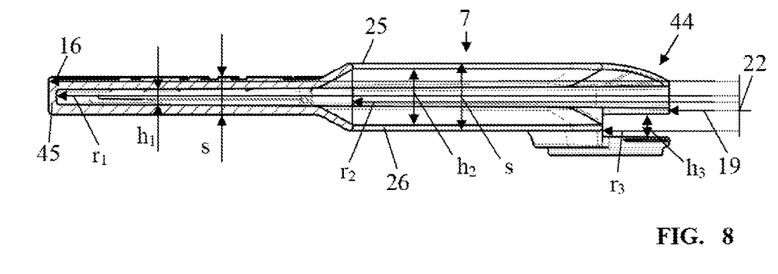
FIGS. 8 and 9 show sectional drawings through the part element.

FIG. 8 shows a section through the first part element 7 along the section line VIII-VIII shown in FIG. 2, the section line extending between the central material cutouts 24. On account of the identical parts, the same applies to the second part element 8. As shown in FIG. 8, the part element (7, 8) is configured as an accommodating profile 44. The accommodating profile 44 includes the two side walls (25, 26) which extend substantially parallel to one another. The side walls (25, 26) are arranged at a side wall spacing (s) from one another, wherein the side wall spacing (s) is variable. The two side walls (25, 26) are connected together via an end-side connection 45. The end-side connection 45 connects the two side walls (25, 26) at the outside radius 16. In the exemplary embodiment, the end-side connection 45 extends circumferentially and without interruption.

A first radius $r_1$ extends from the midpoint 22 of the cut guard 1 as far as the inner wall of the end-side connection 45. Along this first radius $r_1$, the side wall spacing (s) of the first side wall 25 from the second side wall 26 always corresponds to at least a first height $h_1$. A tool 2 having at most a radial extent corresponding to the first radius $r_1$ and at most a thickness corresponding to the first height $h_1$ can thus be inserted into the cut guard 1. Typically, the tools 2 that are suitable for the cut guard 1 have an outside diameter of 210 to 270 mm, in particular of 230 to 250 mm, and a thickness in particular at the cutting edge of 1 to 5 mm, in particular of 1.7 to 3 mm.

The first side wall 25 has the side wall spacing s from the second side wall 26 at a second height $h_2$ which extends from the inside radius 19 as far as a second radius $r_2$ from the midpoint 22 of the cut guard 1. The second height $h_2$ is greater than the first height $h_1$. The second radius $r_2$ is smaller than the first radius $r_1$. A tool 2 having at most a radial extent of the second radius $r_2$ can be inserted in this region of the cut guard 1.

Arranged below the receptacle, formed by the first radius $r_1$ and first height $h_1$, for a tool 2, is a further receptacle for a further tool 2. The further receptacle extends from the inside radius 19 as far as a third radius $r_3$. The further receptacle has a third height $h_3$. The third height $h_3$ is greater than the first height $h_1$ and the third radius $r_3$ is smaller than the first radius $r_1$. On account of the different radii ($r_1, r_2, r_3$) and of the different heights ($h_1, h_2, h_3$), different tools 2 can be inserted into the cut guard 1 and be protected by the cut guard 1. In a further variant embodiment, it is also possible for a plurality of tools 2 to be accommodated at the same time in the cut guard 1.

Figure 9:
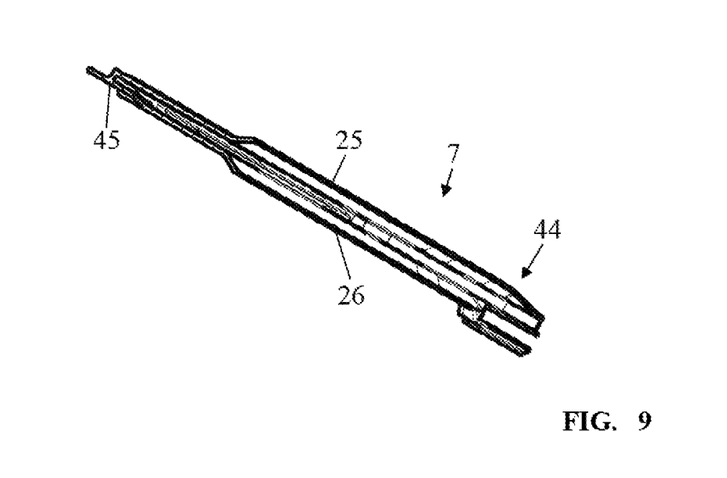

FIG. 9 shows a section through the part element (7, 8) along the section line IX-IX shown in FIG. 2. In a manner corresponding to FIG. 8, the tool receptacles in FIG. 9 extend radially along the part element (7, 8).

FIGS. 10 to 16 show a further variant embodiment of the cut guard 1. This further variant embodiment allows the accommodation of a tool 2 which has for example knife blades which project out of the cutting plane in which the tool 2 rotates in operation. Such a tool 2 can be for example a shredder blade. In FIGS. 10 to 16, identical reference signs denote identical components to those in the original variant embodiment according to FIGS. 1 to 9.

Figure 11:
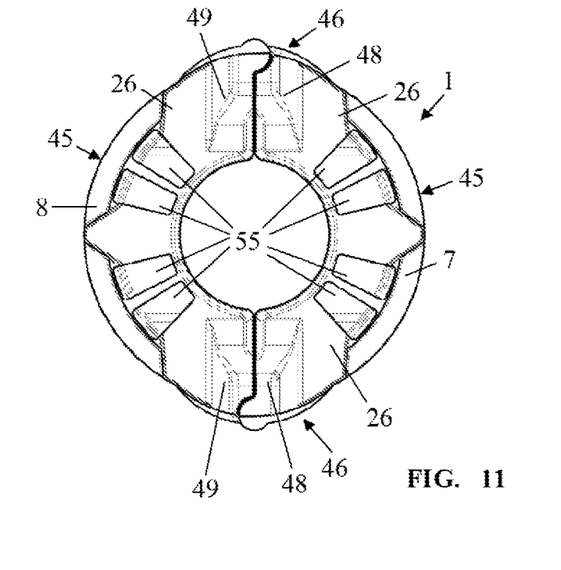

FIG. 10 shows the cut guard 1 in plan view, and FIG. 11 shows the cut guard 1 in a bottom view. Both FIGS. 10 and 11 show the cut guard 1 in the protective state 13. The two part elements (7, 8) have been connected together via the two pivot joints (14, 15). In this variant embodiment, the distance of the first midpoint 17 of the first pivot joint 14 from the second midpoint 18 of the second pivot joint 15 is greater than twice the outside radius 16. In order to protect the pivot joints (14, 15) from damage, protuberances 47 are arranged at the ends 9 to 12 at the end-side connection 45 arranged at the outside radius 16. The protuberances 47 are in a partially circular form in plan view. The protuberances 47 extend beyond the midpoints (17, 18) of the pivot joints (14, 15). As a result, the pivot joints (14, 15) are largely protected from damage. As a result of the protuberance 47, a tool 2 having a diameter greater than twice the outside radius 16 can additionally be accommodated by the cut guard 1. In the exemplary embodiment according to FIGS. 10 to 16, this is a shredder blade (not shown) which has a two-blade cutter and in the case of which the knife blades project out of the cutting plane.

On the second side wall 26, bowls 46 that are shown in FIG. 11 are arranged in the region of the protuberance 47. In this case, one bowl 46 is formed on each pivot joint (14, 15). The bowl 46 projects out of the cutting plane. The bowl 46 includes a first half-bowl 48 and a second half-bowl 49. When a pivot joint (14, 15) is opened, the half-bowls (48, 49) are separated from one another. As a result, a shredder blade which has at least one knife blade which projects out of the cutting plane, can be removed from the bowl 46. The half-bowls (48, 49) halve the overall volume of the bowl 46 approximately in equal parts. The half-bowls (48, 49) are formed in an approximately identical manner, but in the region of the pivot joints (14, 15), there are geometric differences on account of the latching mechanism with the latching stub 30 and latching receptacle 31.

Figure 14:
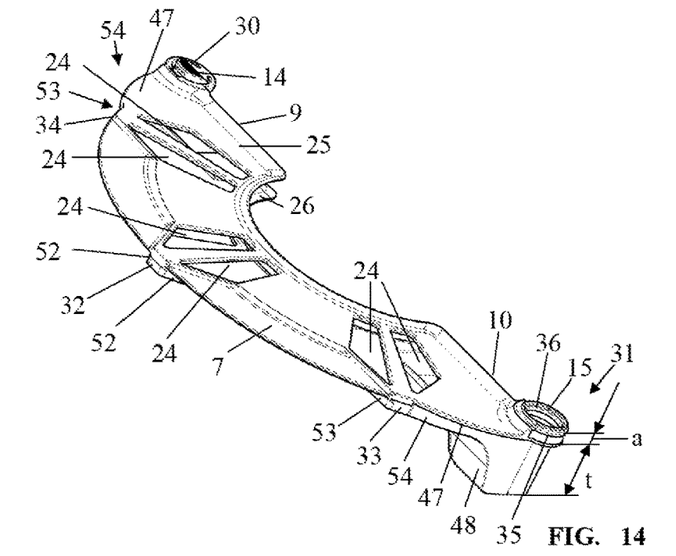
FIG. 14 shows a perspective view of a part element of the cut guard in the further embodiment.
Figure 15:
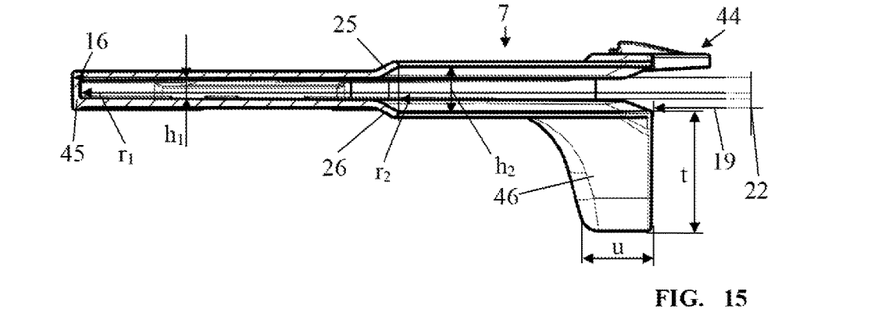
FIGS. 15 and 16 show sectional drawings through the part element of the cut guard in the further embodiment.

FIGS. 14 and 15 show that the bowl 46 points away from the second side wall 26 by a bowl depth (t), starting from the second side wall 26. Thus, the tool 2 can project out of the cutting plane at most by the bowl depth (t). The bowl 46 has a bowl width (u) indicated in FIG. 15. The bowl width (u) ensures that tools 2 having different diameters can be accommodated in the cut guard. The spacing of the two knife blades from one another is decisive for the diameter of the tool 2 in this case. The smallest diameter of the tool 2 having knife blades projecting out of the cutting plane corresponds in this case to twice the inside radius 19. The largest diameter of the tool 2 having knife blades projecting out of the section plane corresponds in this case to twice the inside radius 19 plus twice the bowl width (u).

It can also be seen in FIG. 11 that material cutouts 55 are arranged on the second side wall 26, too. In the exemplary embodiment, four material cutouts 55 are arranged on each part element. The material cutouts 55 in the second side wall 26 are located in an offset manner with respect to the material cutouts 24 in the first side wall 25. Reaching through a material cutout 55 in the second side wall 26 and through a material cutout 24 in the first side wall 25 is thus prevented.

Figure 12:
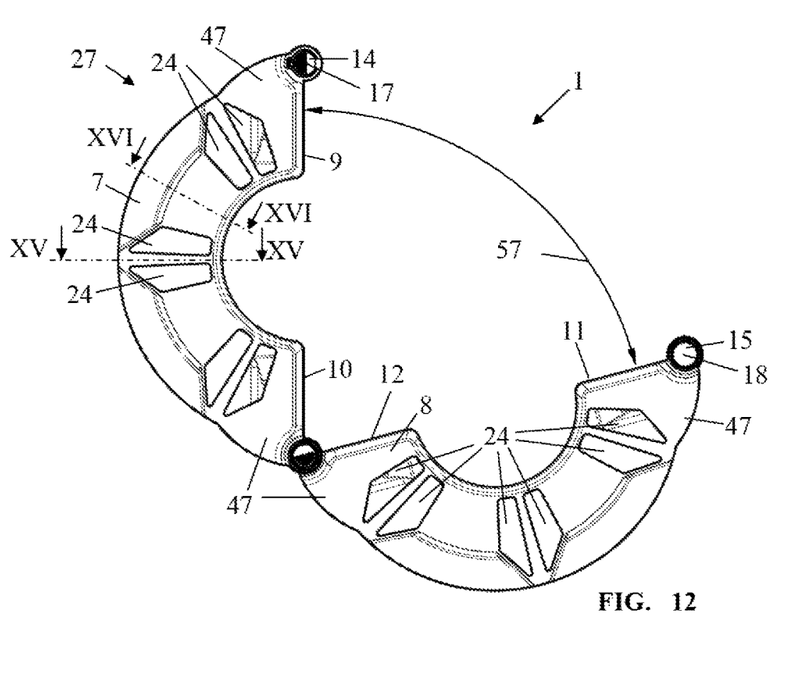
FIG. 12 shows a plan view of the cut guard in the further embodiment in the pivotable state.
Figure 13:
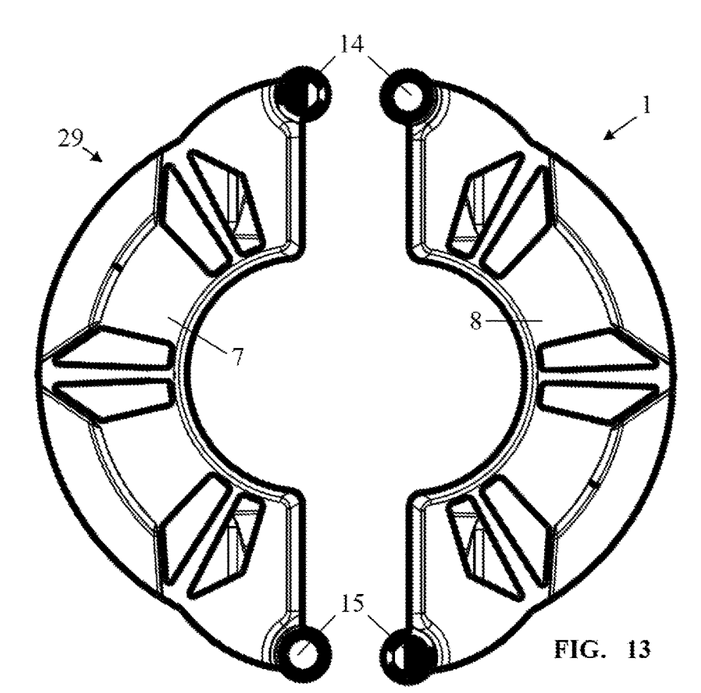
FIG. 13 shows a plan view of the cut guard in the further embodiment in the detached state.

While FIGS. 10 and 11 show the cut guard 1 in the protective state 13, the cut guard 1 is shown in the opened state 27 in FIG. 12. The two part elements (7, 8) have been pivoted with respect to one another as far as an opening angle 57 in the position shown in FIG. 12, wherein the opening angle 57 is smaller than the maximum angle 28. FIG. 13 shows the cut guard 1 in the separated state 29, in which the two part elements (7, 8) have been separated from one another.

FIG. 14 shows a part element (7, 8) in a perspective view, wherein pockets (32, 33, 34) are provided on the second side wall 26 on the part element (7, 8) in this variant embodiment, too. In addition, the half-bowls (48, 49) are arranged on the second side wall 26. Thus, in this variant embodiment, the cut guard 1 can accommodate all of the tools 2 of the other variant, in particular a two-blade cutter 3, a three-blade cutter 4, a four-blade cutter 5, a circular saw blade 6 or the like, or the cut guard 1 can accommodate a tool 2 having a knife which projects out of the cutting plane, for example a shredder blade.

Figure 16:
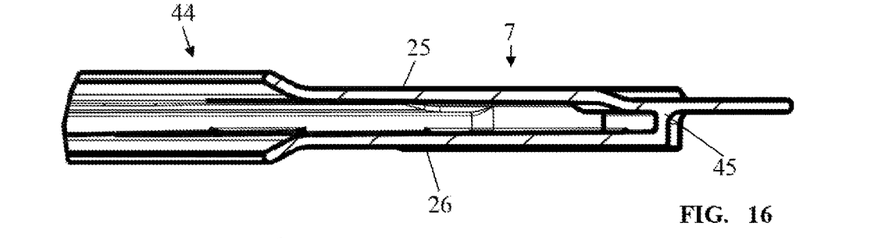

FIGS. 15 and 16 show sections along a section line XV-XV and XVI-XVI, respectively, shown in FIG. 12, of the part element (7, 8). It can be seen from these sections that the cut guard 1 can accommodate on the one hand tools 2 which do not project out of the cutting plane. On the other hand, via the bowls 46, the cut guard 1 can accommodate tools 2 which project out of the cutting plane. It can additionally be seen in FIG. 15 that the bowl 46 extends to a considerable distance away from the second side wall 26. In this way, the cut guard 1 can accommodate various tools 2 having different diameters, different thicknesses and different geometries.

Figure 17:
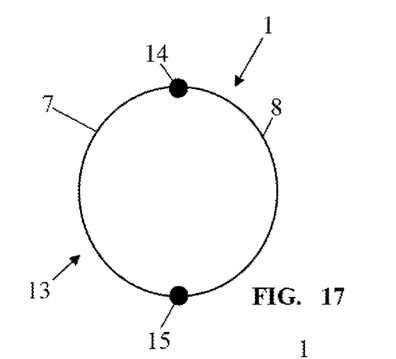
FIGS. 17 to 23 show schematics of a cut guard in the latched, pivotable, detached state with a different number of part elements and with a different arrangement of pivot joints having latching receptacles and latching stubs.
Figure 18:
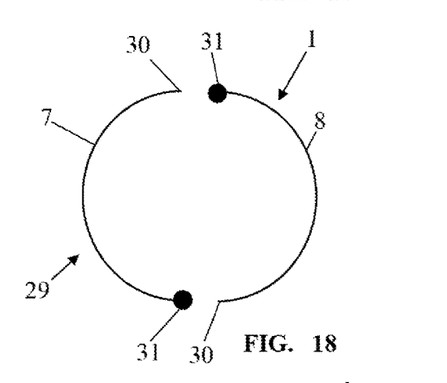

FIGS. 17 to 23 show basic illustrations of the multi-part cut guard 1. FIGS. 17 to 20 show in this case the variant embodiments according to FIGS. 1 to 16. FIG. 17 shows the cut guard 1 in the protective state 13, FIG. 18 the cut guard 1 in the separated state 29 and FIGS. 19 and 20 the cut guard 1 in the pivotable state 27. The cut guard 1 is in two parts, the first part element 7 and the second part element 8. The two part elements (7, 8) are latched together via the pivot joints (14, 15) in the protective state 13 shown in FIG. 17. In FIG. 18, the latching stubs 30 have been separated from the latching receptacles 31 at both ends of the two part elements (7, 8). According to FIG. 18, one latching stub 30 and one latching receptacle 31 are arranged on each part element (7, 8).

Figure 19:
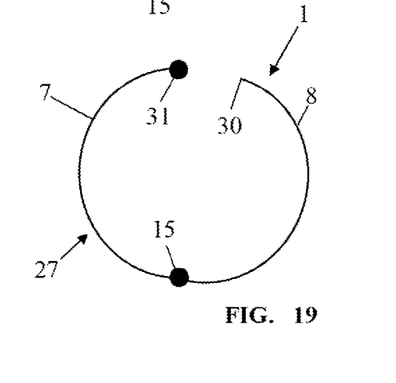
Figure 20:
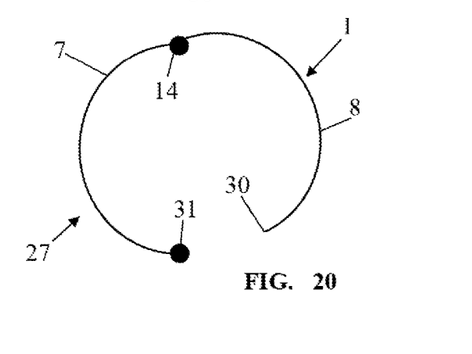

FIGS. 19 and 20 show how, in the pivotable state 27, the cut guard 1 is pivotable either about the first pivot joint 14, as shown in FIG. 20, or is pivotable about the second pivot joint 15, as shown in FIG. 19. The user can freely decide whether the two part elements (7, 8) are pivotable about the first pivot joint 14 or about the second pivot joint 15. This simplifies the handling of the cut guard 1; the user can freely decide whether to open the cut guard 1 at one of the pivot joints (14, 15) or whether he wishes to have both pivot joints (14, 15) open or to have the cut guard 1 in the latched state.

Figures 21, 22, 23:
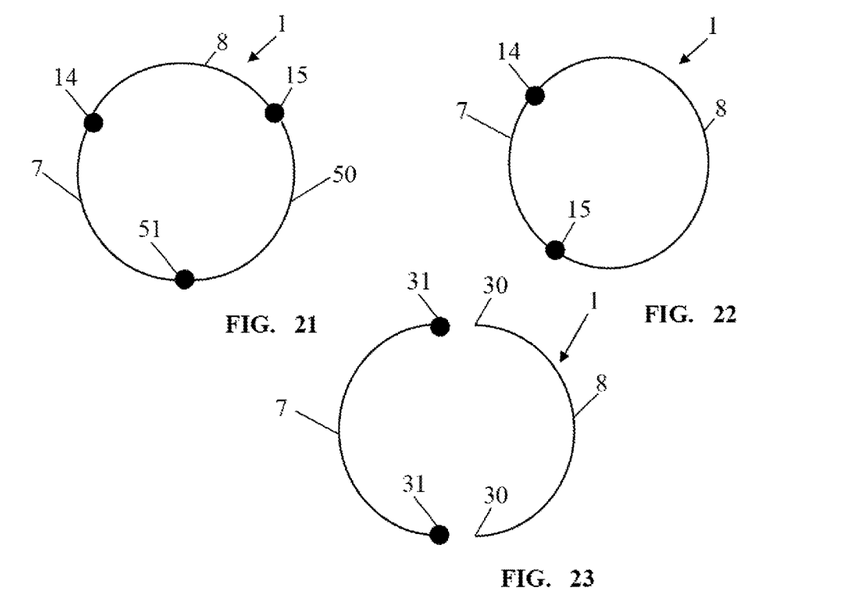
Figure 24:
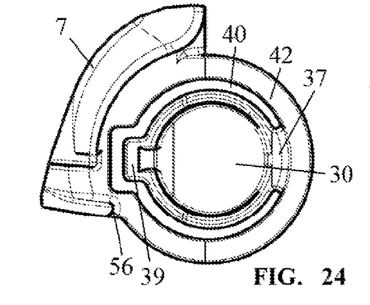
FIGS. 24 to 26 show detail views of the part element in the region of the latching stub having a stop.
Figure 25:
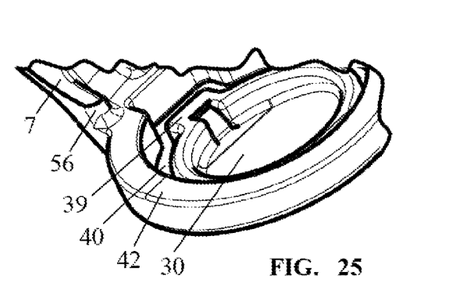
Figure 26:
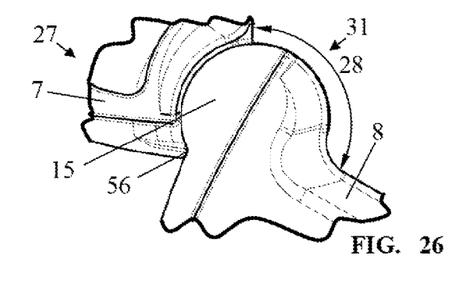
Figure 27:
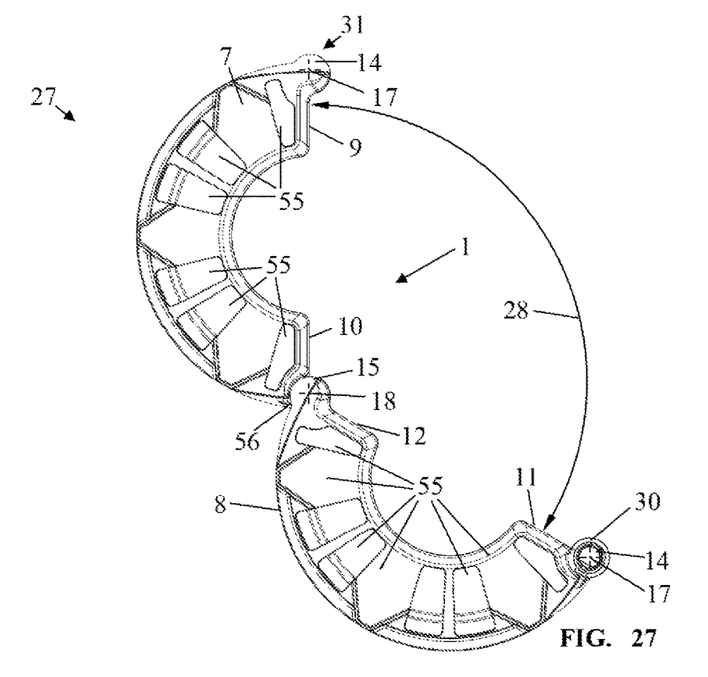
FIG. 27 shows a bottom view of the cut guard of the second part element at the stop of the first part element.

FIG. 21 shows for example that the cut guard can have a third part element 50. To this end, provision is made for the cut guard 1 to have a further connection, in particular a third pivot joint 51. In the exemplary embodiment according to FIG. 21, the first pivot joint 14 is arranged between the first part element 7 and the second part element 8, the second pivot joint 15 is arranged between the second part element 8 and the third part element 50, and the third pivot joint 51 is arranged between the third part element 50 and the first part element 7. In this exemplary embodiment, too, the pivot joints (14, 15, 51) are made of latching stubs 30 and latching receptacles 31, wherein one latching stub 30 and one latching receptacle 31 are arranged on each part element (7, 8, 50). In the exemplary embodiment, the part elements (7, 8, 50) are identical parts. They are in a partially circular form and span an arc of in each case 120°.

FIG. 22 shows how the first part element 7 and the second part element 8 can span arcs of different lengths. In this case, the two part elements (7, 8) are not identical parts.

FIG. 23 shows how a latching receptacle 31 is arranged at each of the two ends of the first part element 7. A latching stub 30 is arranged at each of the two ends of the second part element 8. The latching stub 30 can be latched together with the latching receptacle 31, with the result that the pivot joint (14, 15) is produced. The part elements (7, 8) are not identical parts in this exemplary embodiment.

FIGS. 24 to 27 show a further variant embodiment of the cut guard 1. A stop 56 is integrally formed on the part element 7 in the region of the pivot joint 15, in particular in the region of the latching stub 30. If the second part element 8 is pivoted up to the maximum angle 28 in the open state 27 (FIGS. 26 and 27) of the cut guard 1, then the second part element 8 rests against the stop 56 on the first part element 7. The stop 56 on the first part element 7 is, in this position, located in the region of the latching receptacle 31 of the second part element 8. Thus, in this variant embodiment, the second part element 8 can be pivoted about the first part element 7 at most as far as the maximum angle 28. Separation of the two part elements (7, 8) by an excessive opening angle is thus prevented by the stop 56.

The stop 56 is arranged on the first part element 7 such that the second part element 8 can be pivoted exactly as far as the maximum angle 28 and subsequently rests against the stop 56. In the exemplary embodiment, the stop 56 protrudes from the plane of the holder 42. The stop 56 is perpendicular to the holder 42. The stop 56 ends approximately at the transition of the part element 7 to the holder 42. In plan view (FIG. 24), the stop ends approximately at the level of the lug 39 on the latching stub 30. The width of the stop 56 corresponds approximately to the height of the stop 56. The surface of the stop 56 by way of which the stop 56 rests against the second part element 8 is formed in a curved manner such that the surface of the stop 56, when resting against the second part element 8, rests extensively against the curved bearing surface of the second part element 8.

On account of the identical formation of the first part element 7 and the second part element 8, an identical stop 56 is formed on the second part element 8, too.

Figure 28:
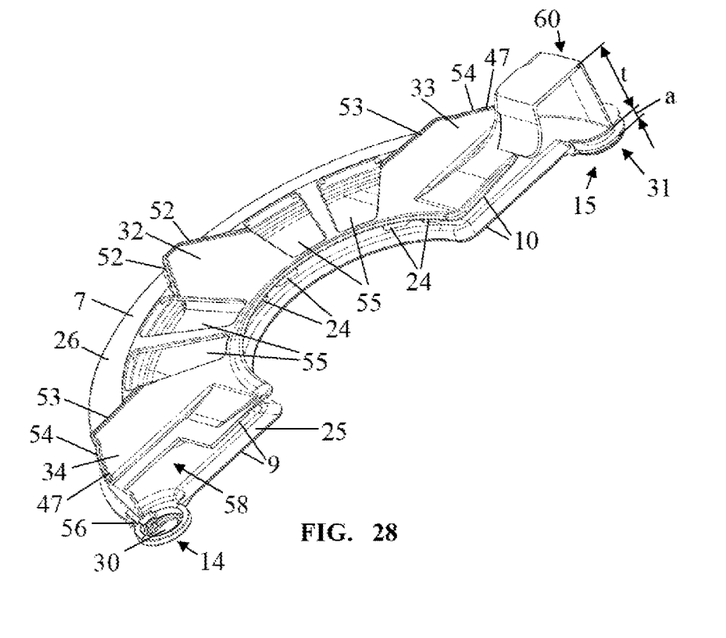
FIG. 28 shows a perspective view of the part element of the cut guard in a further embodiment; and, FIGS. 29 and 30 show perspective views of the cut guard in the latched state in the further embodiment with and without a tool.
Figure 29:
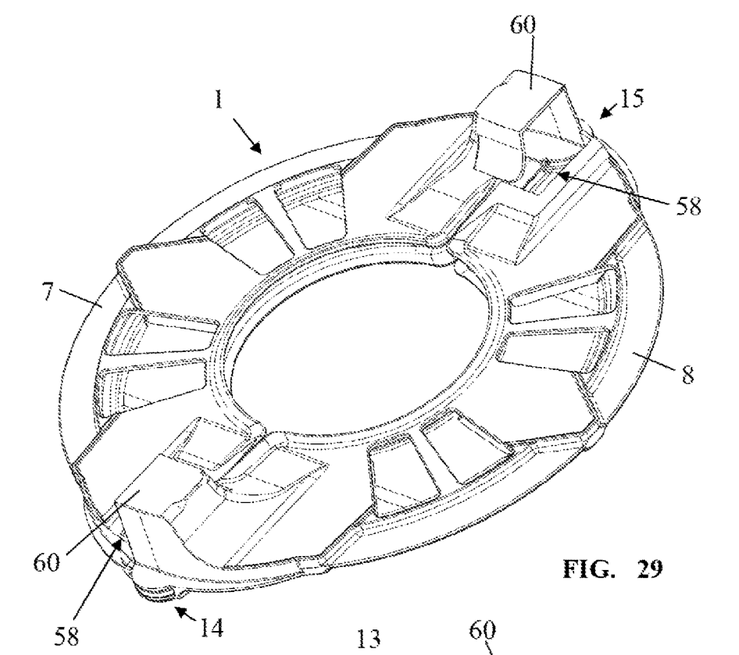
Figure 30:
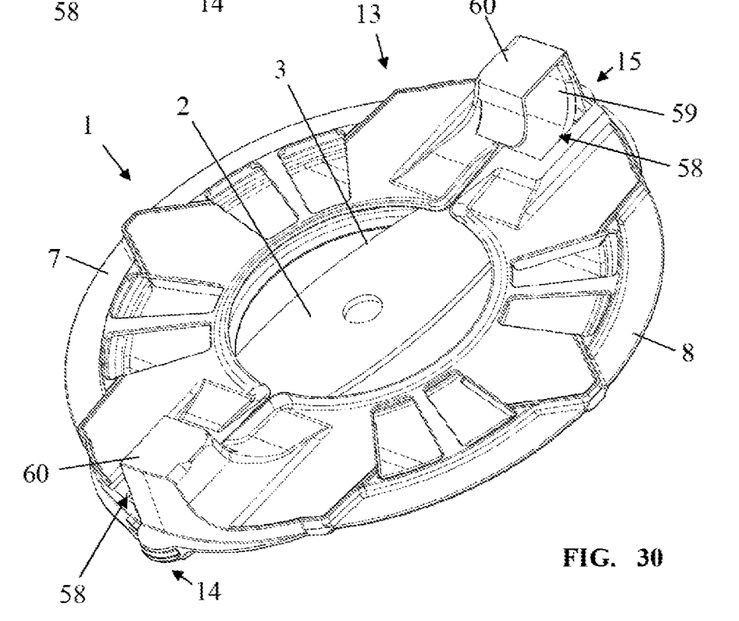

FIGS. 28 to 30 show a further variant embodiment of the cut guard 1. In this variant embodiment, it is possible to accommodate a tool 2 which has knife blades 59 which project out of the cutting plane in which the tool 2 rotates during operation. In FIG. 28, the first part element 7 is shown separately. In FIGS. 29 and 30, the cut guard 1 is shown in the protective state 13, wherein both part elements (7, 8) are embodied in an identical manner to the first part element 7 in FIG. 28.

A bowl 60 is arranged at the second end 10 of the first part element 7, specifically in the region of the latching receptacle 31. The bowl 60 is formed on the second side wall 26 and projects out of the cutting plane of the tool 2. The bowl 60 projects laterally beyond the second end 10 such that the bowl 60 terminates laterally with the latching receptacle 31. This side of the bowl 60 is open in order that a tool 2 can be inserted. This side remains open even in the protective state 13 of the cut guard 1 (FIGS. 29 and 30).

At the first end 9 of the first part element 7, specifically in the region of the latching stub 30, the second side wall 26 has a recess 58. The tool 2, embodied as a two-blade cutter 3, has a knife blade 59 on each cutter section. The tool 2 is first of all inserted into the first part element 7. In this case, one knife blade 59 is located in the bowl 60 and the other knife blade 59 in the recess 58. Subsequently, the two part elements (7, 8) are latched together such that the cut guard 1 is in the protective state 13 (FIG. 30). In this case one knife blade 59 of the tool 2 is located in the bowl 60 of the first part element 7 and in the recess 58 of the second part element 8. The other knife blade 59 is located in the bowl 60 of the second part element 8 and in the recess 58 of the first part element 7.

In all of the variant embodiments, provision can be made for the part elements (7, 8), in the protective state 13, to be connected together, in addition to the latched pivot joints (14, 15), in a form-fitting manner, for example by way of a tongue-and-groove connection in the region of the half-bowls. In this case, a groove is integrally formed at one end (9, 10) of the part element (7, 8, 11, 12). A tongue is integrally formed on the other end (10, 9, 12, 11) of the part element (7, 8). The tongue and the groove are expediently located in a plane which is oriented parallel to the cutting plane. In the protective state, the tongue engages in the groove in the manner of a tongue-and-groove connection. The tongue-and-groove connection supports the stability of the cut guard 1 in the protective state 13.

In all of the exemplary embodiments, the part elements (7, 8) and thus the cut guard 1 are made of plastics material. The part elements (7, 8) are produced in a plastics injection-molding process. In the exemplary embodiments in which the part elements (7, 8) represent identical parts, the same injection mold can be used for the production of both part elements (7, 8).

In all of the variant embodiments, identical reference signs denote identical components.

It is understood that the foregoing description is that of the preferred embodiments of the invention and that various changes and modifications may be made thereto without departing from the spirit and scope of the invention as defined in the appended claims.

What is claimed is:

1. A multi-part cut guard for a work tool configured to rotate in a cutting plane, the multi-part cut guard comprising:
a first part element having a first and a second end;
a second part element having a first and a second end;
said first part element and said second part element being configured to interconnect at corresponding ones of said first and corresponding ones of said second ends via respective closure mechanisms so as to mutually define a closed circumference;
each of said closure mechanisms being snap-fitting connections;
each of said snap-fitting connections being formed by a respective latch receptacle and a respective latch stub;
said latch receptacles being formed on at least one of said first part element and said second part element;
said latch stubs being formed on at least one of said first part element and said second part element;
at least one of said snap-fitting connections being configured to form a pivot joint when in a latched state so as to enable said first part element and said second part element to pivot toward each other about said pivot joint;
said pivot joint interconnecting said first end of said first part element and said first end of said second part element;
said second end of said first part element and said second end of said second part element being configured to detachably interconnect;
corresponding ones of said latch stub and said latch receptacle being configured to be separated from each other when in an unlatched state;
the multi-part cut guard defining a cut guard plane;
said pivot joint defining a rotational axis; and,
said rotational axis being arranged perpendicular to the cut guard plane; and,
at least one of said first and said second part elements having at least one funnel-shaped lead-in slope.

2. The multi-part guard of claim 1, wherein said first part element and second part element are configured rigidly.

3. The multi-part guard of claim 1, wherein at least on of said first and second part element is configured as an accommodating profile having a first side wall and a second side wall arranged opposite each other.

4. The multi-part cut guard of claim 3, wherein said first and second side walls are parallel to each other and define a side wall distance between each other; and, the cutting guard further comprises an end connection interconnecting said first and said second side wall.

5. The multi-part cut guard of claim 3, wherein said first side wall defines a first material cutout.

6. The multi-part cut guard of claim 5, wherein:
said second side wall defines a second material cutout; and,
said second material cutout is arranged offset with respect to said first material cutout.

7. The multi-part cut guard of claim 5, wherein:
said first side wall defines a first side wall surface; and,
said first material cutout opens surfaces having a total area corresponding to at least 10% of said first side wall surface.

8. The multi-part cut guard of claim 3, wherein:
said first side wall has a bearing surface formed thereon; and,
said bearing surface is configured to have the work tool at least partially come into contact therewith.

9. The multi-part cut guard of claim 3, wherein said accommodating profile is arc-shaped.

10. The multi-part cut guard of claim 3, wherein said accommodating profile is shaped as a part circle.

11. The multi-part cut guard of claim 9, wherein said arc-shaped accommodating profile encompasses 180°.

12. The multi-part cut guard of claim 1, wherein said first part element and said second part element are configured to be opened and closed at said pivot joint without a tool.

13. The multi-part cut guard of claim 1, wherein the cut guard plane corresponds to the cutting plane of the work tool.

14. The multi-part cut guard of claim 1, wherein:
said pivot joint defines a first circle centroid and a second circle centroid;
said pivot joint defines a first rotational axis and a second rotational axis;
said first circle centroid corresponds to said first rotational axis;
said second circle centroid corresponds to said second rotational axis;
said first circle centroid and said second circle centroid define a mutual spacing;
the cut guard defines a circular cutout having an outer radius; and,
said mutual spacing is smaller than double said outer radius.

15. The multi-part cut guard of claim 1, wherein:
the cut guard defines a circular cutout having an inner radius and an outer radius; and,
said inner radius and said outer radius define a difference which is greater than a third of said outer radius.

16. The multi-part cut guard of claim 1, wherein:
the cut guard defines a circular cutout having an inner radius and an outer radius; and,
said inner radius and said outer radius define a difference which is greater than half of said outer radius.

17. A multi-part cut guard for a work tool configured to rotate in a cutting plane, the multi-part cut guard comprising:
a first part element having a first and a second end;
a second part element having a first and a second end;
said first part element and said second part element being configured to interconnect at corresponding ones of said first and corresponding ones of said second ends via respective closure mechanisms so as to mutually define a closed circumference;
each of said closure mechanisms being snap-fitting connections;
each of said snap-fitting connections being formed by a respective latch receptacle and a respective latch stub;
said latch receptacles being formed on at least one of said first part element and said second part element;
said latch stubs being formed on at least one of said first part element and said second part element;
at least one of said snap-fitting connections being configured to form a pivot joint when in a latched state so as to enable said first part element and said second part element to pivot toward each other about said pivot joint;
said pivot joint interconnecting said first end of said first part element and said first end of said second part element;
said second end of said first part element and said second end of said second part element being configured to detachably interconnect;

corresponding ones of said latch stub and said latch receptacle being configured to be separated from each other when in an unlatched state;

the multi-part cut guard defining a cut guard plane;

said pivot joint defining a rotational axis; and, said rotational axis being arranged perpendicular to the cut guard plane; and, each of said latch stubs having an inclined surface configured for insertion into corresponding ones of said latch receptacles.

18. The multi-part cut guard of claim 17, wherein said first part element has a stop for said second part element configured to limit a pivot movement of said first part element about said second part element to a maximum angle.

19. The multi-part cut guard of claim 17, wherein said first part element and said second part element are identical parts.

20. The multi-part cut guard of claim 17, wherein said one of said latch stubs is arranged on said first part element and a corresponding one of said latch receptacles is arranged on said second part element.

21. The multi-part cut guard of claim 17, wherein:

said first part element is formed as a one-piece with corresponding ones of said latch receptacles and said latch stubs; and, said second part element is formed as a one-piece with corresponding ones of said latch receptacles and said latch stubs.

22. The multi-part cut guard of claim 17, wherein:

said first part element and said second part element each have a respective holder formed thereon; and, each of said latch stubs is held at a corresponding holder via a corresponding resilient connection.

23. The multi-part cut guard of claim 17, wherein both of said closure mechanisms form a joint when in said latched state.

24. The multi-part cut guard of claim 17, wherein said latch stubs and said latch receptacles at least in sections thereof each have a round contour.

25. The multi-part cut guard of claim 17, wherein said first part element is pivotable about said second part element by a maximum angle and a corresponding one of said snap-fitting connections is configured to disengage when said first part element is pivoted about said second part element beyond said maximum angle.

26. The multi-part cut guard of claim 17, wherein:

said latch stubs include a first latch stub and a second latch stub;

said latch receptacles include a first latch receptacle and a second latch receptacle;

said first latch receptacle is arranged on said first part element;

said first latch stub is arranged on said second part element;

said second latch receptacle is arranged on said second part element; and, said second latch stub is arranged on said first part element.

27. A multi-part cut guard for a work tool configured to rotate in a cutting plane, the multi-part cut guard comprising:

a first part element having a first and a second end;

a second part element having a first and a second end;

said first part element and said second part element being configured to interconnect at corresponding ones of said first and corresponding ones of said second ends so as to mutually define a closed circumference;

a latch receptacle at one of said first ends;

a latch stub at the other one of said first ends;

said latch receptacle and said latch stub being configured to latch together so as to conjointly form a pivot joint when in a latched state;

said pivot joint interconnecting said first end of said first part element and said first end of said second part element;

said second end of said first part element and said second end of said second part element being configured to detachably interconnect;

said latch stub and said latch receptacle being configured to be separated from each other when in an unlatched state;

the multi-part cut guard defining a cut guard plane;

said pivot joint defining a rotational axis;

said rotational axis being arranged perpendicular to the cut guard plane;

at least one of said first part element and said second part element having a bowl formed thereon in the region of said pivot joint; and, said bowl projecting beyond the cutting plane.

* * * * *

UNITED STATES PATENT AND TRADEMARK OFFICE
CERTIFICATE OF CORRECTION

PATENT NO. : 10,512,999 B2  
APPLICATION NO. : 14/542490  
DATED : December 24, 2019  
INVENTOR(S) : Behringer et al.

Page 1 of 1

It is certified that error appears in the above-identified patent and that said Letters Patent is hereby corrected as shown below:

In the Claims

In Column 13:  
Line 42: delete "2. The multi-part guard" and insert -- 2. The multi-part cut guard -- therefor.

In Column 13:  
Line 43: insert -- said -- after "element and".

In Column 13:  
Line 44: delete "3. The multi-part guard" and insert -- 3. The multi-part cut guard -- therefor.  
Line 44: delete "wherein at least on of" and insert -- wherein at least one of -- therefor.

In Column 13:  
Line 45: insert -- said -- after "said first and".

Signed and Sealed this  
Eighteenth Day of August, 2020

Andrei Iancu  
*Director of the United States Patent and Trademark Office*